United States Patent

[11] 3,608,555

| [72] | Inventor | William L. Greyson |
| | | Wayne, N.J. |
| [21] | Appl. No. | 792,896 |
| [22] | Filed | Dec. 31, 1968 |
| [45] | Patented | Sept. 28, 1971 |
| [73] | Assignee | Chemplast Inc. |
| | | Wayne, N.J. |

[54] RADIO OPAQUE AND OPTICALLY TRANSPARENT TUBING
4 Claims, 3 Drawing Figs.
[52] U.S. Cl. .................................... 128/348,
128/2, 138/118, 138/177, 252/478
[51] Int. Cl. ........................................ A61m 25/00
[50] Field of Search .............................. 128/348–351,
2; 138/118, 177; 264/237; 252/478

[56] References Cited
UNITED STATES PATENTS

| 3,529,633 | 9/1970 | Vaillancourt.................. | 138/118 |
| 2,237,218 | 4/1941 | Flynn ............................ | 138/118 |
| 2,598,283 | 5/1952 | Miller............................ | 264/237 X |
| 2,720,680 | 10/1955 | Gerow........................... | 264/237 X |
| 2,857,915 | 10/1958 | Sheridan ...................... | 128/349 |
| 3,112,748 | 12/1963 | Colburn ....................... | 128/350 |
| 3,228,894 | 1/1966 | Jeckel ........................... | 252/478 |
| 3,361,700 | 1/1968 | Archer et al.................. | 252/478 X |

FOREIGN PATENTS

| 634,669 | 3/1950 | Great Britain................ | 128/348 |
| 686,445 | 1/1953 | Great Britain................ | 128/348 |

*Primary Examiner*—Dalton L. Truluck
*Attorney*—Popper, Bain & Bobis

ABSTRACT: Tubing having a smooth inner bore and a smooth even outer surface wherein the properties of X-ray opacity and optical permeability are optimized and maximized by forming the tubing from a plastic and an X-ray opaque substance homogeneously dispersed in the plastic wherein the X-ray opaque substance has a controlled concentration and an index of refraction as close to the index of refraction of the plastic as possible; additionally where the plastic forms crystalline structures it is not annealed during the fabrication of the tubing to further optimize optical permeability of the tubing.

PATENTED SEP 28 1971 3,608,555

WILLIAM L. GREYSON
INVENTOR.

BY Popper Bain + Bobis
Attys

RADIO OPAQUE AND OPTICALLY TRANSPARENT TUBING

BACKGROUND OF THE INVENTION

Relatively thin tubing from cellulosic and plastic materials wherein the tubing is made X-ray opaque either in whole or in part throughout its entire length or is provided with X-ray opaque graduations at intervals along its length are a known expedient in the prior art because of the extensive need for these devices as catheters or tubing for use in angiocardiography; for the removal of blood from the heart; for measuring the blood pressure in the heart; for X-ray illumination of the aorta, arteries and veins; for the taking of samples of urine from the kidneys, urethra and bladder; for X-ray illumination of the urinary track, adrenal and other glands and for other X-ray illumination in the body.

Such tubing has been made in a variety of ways with a variety of materials as is set forth in British Pat. No. 726,706 U.S. Pat. No. 2,212,334 and U.S. Pat. No. 2,857,915.

It is also well recognized more particularly in the prior art devices related to heart catheters and other tubing with X-ray opaque means incorporated therein that certain inherent deficiencies exist as is well stated in the above mentioned prior art patents.

U. S. Pat. No. 2,857,915 represents one means in the more recent prior art efforts to meet that problem of the prior art of providing X-ray opaque means in tubing which is also optically permeable; that is tubing in which the flow of fluid into, through and out of the tubing is readily visible to the naked eye.

This last-mentioned characteristic is important because these tubes are used for transmitting medication and other fluids into the passages or organs in which they are passed or placed and for the moving of samples of blood and other fluids to be checked during the use of such catheters or tubes.

It is noted that a major disadvantage of the prior art devices is that in meeting one or more of the prior art problems such as providing an X-ray opaque catheter or tube such devices as have been heretofore produced have irregular and uneven internal bores and the outer walls or surfaces will not be as smooth and continuous as is desirable in devices of this type.

It is recognized that the unevenness or breaks in surface continuity in the bore or on the outer wall or surface of the catheters or tubing are so minute and small as not to be visible to the naked eye. However, such inner and outer surface irregularities present extreme difficulty to the effective surgical use of such devices and add to the discomfort of the patient in view of the extensive and prolonged physical contact thereof in the extremely sensitive areas of the body in which these devices are used or placed.

This characteristic of the tubing or catheters is not only important at or adjacent the insertion point for catheters or tubing but also along the entire outer surface of the tubing because it must travel through arteries, veins, ducts and body passages during use.

Further, it has been found difficult to provide an X-ray opaque catheter or tubing which is also at least optically translucent because because the compounds and materials used to render the tubing X-ray opaque have heretofore also acted to substantially impair the optical permeability of the tubing.

Thus, for example, a well-known and prevalent type of X-ray opaque catheter which is completely opaque to both visible light and to X-rays is made by incorporating X-ray opaque material such as finely divided metallic tungsten in the material which makes up the entire wall of the catheter.

Another well-known device as disclosed and shown in U.S. Pat. No. 2,857,915 utilizes a bismuth salt, i.e., bismuth subnitrate or bismuth oxide but constructs the catheter so that the X-ray opaque substance is limited to a line segment of the catheter wall to thus form an X-ray opaque strip along the length of the catheter. The remaining portion of the catheter wall is made of a material which is optically transparent.

In their efforts to accomplish X-ray opacity the prior art devices are also met with the additional problems regarding the uneven and irregular surfaces on the inner and outer walls.

All of the foregoing problems of the prior art devices are thought to be overcome by the present invention and this is accomplished by the simple expedient of first selecting a plastic adapted to provide smooth substantially friction-free surfaces on and in the catheter or tubing, second mixing with such plastic prior to the formation of the catheter or tubing a selected X-ray opaque material in the desired concentration which has an index of refraction similar to the index of refraction of the plastic from which the catheter or tubing will be made.

Additionally to increase optical permeability of the formed catheter or tubing where plastics such as polytetrafluoroethylene are used, crystallization is minimized during the formation of the catheter or tubing.

It has been found that such devices when made as hereinafter to be more fully described will produce a catheter having X-ray opaque characteristics wherein the normal optical opacity produced by such X-ray opaque substances is minimized and these catheters will be optically permeable or optically translucent as a minimum to permit visual obseryance of the flow of liquids more particularly colored liquids therethrough.

SUMMARY OF THE INVENTION

Thus, the present invention covers the method of making catheters or tubing and the products derived from such method wherein the catheter or tubes are formed from a plastic material, such as a perfluorocarbon resin, homogeneously mixed with a predetermined concentration of X-ray opaque substance having an index of refraction close to that of the plastic material so as to form a tube having a smooth continuous inner bore and outer wall surface which is X-ray opaque and has sufficient optical permeability or optical translucency to visible light to permit the viewing of fluid flow therethrough. Additionally and to further optimize and maximize the optical properties of the catheter and tubing where the same is formed with plastic materials such as perfluorocarbon resins or crystalline-forming materials, crystallization is minimized during the formation of such catheter or tubing.

OBJECTS AND ADVANTAGES

Accordingly, it is an object of the present invention to provide an improved X-ray opaque catheter or tubing having sufficient optical properties or permeability as to permit visible inspection of fluid therein and flowing therethrough. A more complete understanding of the improved catheter or tubing of the present invention and the method of fabricating the same can be had by reference to the accompanying drawings in which.

Referring in detail to the drawings, the catheter is a generally circular, seamless, nonfibrous tube 10 of substantially uniform cross section.

The tube 10 is made from a suitable plastic material. A variety of products are commercially available for this purpose, for example, there include certain forms of perfluorocarbon resins such as tetrafluoroethylene homopolymers and copolymer thereof such as fluorinated ethylene propylene (F.E.P.); certain vinyl polymers, such as polyvinyl chloride and homopolymers and copolymers of polyvinyl chloride.

In contrast to the line or segment of X-ray opaque material in the structure shown and described in U.S. Pat No. 2,857,915, tube 10 of applicant's device is made of a plastic material having an X-ray opaque pigment uniformly and homogeneously dispersed therethrough.

X-ray opaque materials which are available for this purpose include thermally stable insoluble compounds or elements having high atomic numbers such as barium sulfate, bismuth oxide or a bismuth salt which are not reactive with the perfluorocarbon resins or other plastics at any of the temperatures applying to the fabrication of these devices.

Figure 1:
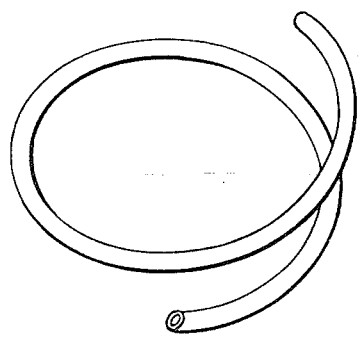
FIG. 1 is a plan view of one form of tubing made in accordance with the present invention.
Figure 2:
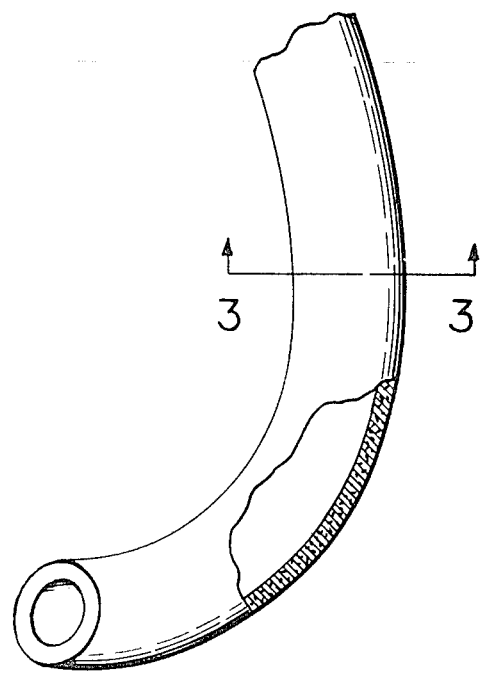
FIG. 2 is an enlarged view of the tubing of FIG. 1 broken away partly in horizontal section.
Figure 3:
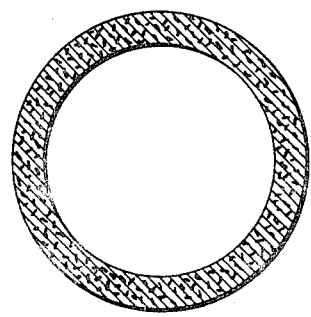
FIG. 3 is a cross section taken on line 3—3 of FIG. 2.

The cross-sectional portion of tube 10 shown at FIG. 2 and 3 indicates that the X-ray opaque material generally designated 11 is uniformly and homogeneously dispersed through the plastic.

The catheter or tubing of the present invention can be fabricated in several ways depending on the type plastic utilized. It can, for example, be extruded or it can be molded as suits the particular material.

Basically, the first consideration, however, is that the materials selected for the catheter or tubing must be such that when formed the X-ray opaque substance will be homogeneously dispersed in the walls of the catheter and the plastic and X-ray opaque substances mixed together will have indices of refraction that will bear sufficient similarity to each other to provide the functional results of radio or X-ray opacity on the one hand and optical transparency on the other.

Second, where the plastic material can be made crystalline in nature and so allows, then in the formation the plastic and X-ray opaque mixture can be so treated that optical opacity will be minimized and conversely optical permeability maximized in the final product.

It is known that X-ray opacity is proportional to the quantity of additives and their atomic number. For example, finely powdered tungsten with an atomic number of 74 is extremely effective when added to plastic materials in producing opacity to X-rays. However, this material also produces an optically opaque wall when used in the formation of catheters made of plastic. Accordingly, this material cannot be used in the present invention to meet the problems of the prior art.

In devices made in accordance with the present invention, it has been found in mixtures of the substances from which the catheter or tubing is made, that the closer the index of refraction of the X-ray opacifier or additive utilized is to the plastic material of which the catheter wall is made, that the greater will be the degree of optical permeability produced with any given X-ray opaque material added to such plastic material. The generally accepted figures for the indices of refractions for example, of one well-known plastic namely polytetrafluoroethylene is 1.33 and the index of refraction of other well-known resins and polymers are as follows: fluorinated ethylene propylene (F.E.P.) is 1.338; polychlortrifluorethylene sold under the trademark KEL-F is 1.425; polyvinylidene sold under the trademark KYNAR is 1.42; acrylics are about 1.5; polyethylenes are 1.5 and polystyrenes 1.6.

The index of refraction of some of the better-known opacifiers or additives which render the wall of the catheter or tubing opaque to X-ray are as follows: barium titanate 2.40; bismuth oxide 1.91 and barium sulfate 1.64.

In the present invention by selecting that opacifier or additive which in the proper concentration will render the wall of the catheter or tubing radio opaque and dispersing the same homogeneously throughout the plastic of which the catheter or tubing is made as is more fully illustrated and described in the examples below, it has been found that X-ray opacity and optical transparency can be simultaneously optimized to produce a catheter or tubing which is X-ray opaque throughout every portion thereof but which has sufficient optical properties to permit light to pass through the walls of the tubing so that the flow of fluids passing in, out and through such catheter or tubing is clearly visible to the observer.

Further, it is known that permeability to visible light is increased when structures formed from perfluorocarbon resins are quickly quenched during their formation. Thus, during the formation of the structures, these plastics and other crystalline-forming plastics used are rapidly cooled by dipping the heated and formed article into a suitable cooling bath. The effect of quenching the article in this manner is to minimize crystallization and to maximize the amorphous condition of the formed structure which last-mentioned condition in plastics provides a more optically permeable or at a minimum optically translucent condition than the crystalline condition of these materials.

Thus, the method of forming catheters or tubing in accordance with the present invention consists broadly of the following steps:

1. Selecting a biologically inert plastic such as a perfluorocarbon resin which will provide a relatively smooth, substantially friction free surface on and in the catheter formed therefrom.

2. Before the formation of the catheter, mixing homogeneously with the plastic selected a radio or X-ray opacifier or additive having an index of refraction in the functional range of the index of refraction of the plastic first selected.

3. Forming the catheter by any suitable method to provide the desired inner diameter and outer diameter.

4. Heat treating the plastic material formed into the catheter and maintaining the same at the treating temperature the required length of time. 5. Where applicable to the material such, for example, as polytetrafluoroethylene quickly quenching the plastic material so that it remains unannealed in the final form of the catheter or tubing.

Examples of catheters or tubing made in accordance with the principles of the present invention will now be illustrated to demonstrate the effects of various types of opacifiers or additives and mixtures of the same for rendering such catheters or tubing, X-ray opaque.

The examples which follow utilize a polytetrafluoroethylene resin hereinafter referred to as "PTFE Resin" which can be purchased on the open market under the Dupont Trademark or identification is Dupont T6-C; commonly identified as a substance "for paste extrusion of thin wall sections, ASTM D1457-Type III."

EXAMPLE I

A quantity of bismuth oxide was obtained in the form of particles having a 200 mesh grade.

PTFE Resin and a portion of the bismuth oxide were intimately mixed in the proportions of 98 percent by weight of PTFE Resin to 0.2 percent by weight of bismuth oxide.

This blend was mixed with VM&P Naptha or like lubricant in the ratio of 81½ percent by weight of the plastic blend to 18½ percent by weight of the lubricant and the lubricated paste was preformed into a billet and fed into the barrel of any conventional type of hydraulic or screwjack, and forced out of the extruder under suitable pressure and at suitable speed through a die adapted to form tubing with an O.D. of 0.034 inches and a wall thickness about 0.010 inches.

As the tubing issued from the die of the extruder, it passed through suitable heating means formed into two heating zones. The first heating zone at 450° F. was used to remove the Naptha lubricant. The second at 750° F. acted to sinter the PTFE Resin blend of which the tubing was fabricated and the tubing was maintained in the oven for a period of 1 minute.

The tubing was then quickly quenched by subjecting it to an aqueous spray bath at a temperature of 50° F.

The resulting tubing produced had a smooth inner bore and very smooth outer surface. The tubing was X-ray opaque when subjected to test and was sufficiently optically translucent to clearly view liquids flowing into, out of and through the tubing.

EXAMPLE II

A blend of PTFE Resin and a portion of 200-mesh bismuth oxide were intimately mixed in the proportions of 92 percent by weight of PTFE Resin and 8 percent by weight of bismuth oxide and tubing of this PTFE Resin belnd was made in the same manner as above described in example I.

It was found that tubing having this concentration of bismuth oxide also produced X-ray opaque tubing, however, the tubes had optically permeability sufficient to observe colored liquids passing through the inside of the tubing.

EXAMPLE III

A quantity of barium sulfate was obtained in the form of crystals having a 200-mesh grade.

PTFE Resin and a portion of the barium sulfate were intimately mixed in the proportions of 92 percent by weight of PTFE resin to 8 percent by weight of barium sulfate and tubing of this PTFE Resin blend was made in the same manner as above described in example I.

The resulting tubing from a mixture with a concentration of 8 percent barium sulfate was X-ray opaque when subjected to test and was optically translucent so as to permit clear viewing of liquids flowing into, out of and through the tubing.

EXAMPLE IV

A blend of PTFE Resin and a portion of the 200-mesh barium sulfate were intimately mixed in the proportions of 88 percent by weight of PTFE Resin and 12 percent by weight of barium sulfate and tubing of this PTFE Resin blend was made in the same manner as above described in example I.

The resulting tubing from a mixture with a concentration of 12 percent by weight of barium sulfate was X-ray opaque when subjected to test but the tubing had only sufficient optical permeability to permit viewing colored liquids passing through the inside of the tubing.

EXAMPLE V

A quantity of barium titanate was obtained in the form of crystals having a 200-mesh grade.

PTFE Resin and a portion of the barium titanate were intimately mixed in the proportions of 98 percent by weight of PTFE Resin and 2 percent by weight of barium titanate and tubing of this PTFE blend was made in the same manner as above described in example I.

The resulting tubing from a mixture with a concentration of only 2 percent by weight of barium titanate was X-ray opaque and optically opaque.

EXAMPLE VI

A blend of PTFE Resin, bismuth oxide and barium titanate were intimately mixed in the proportions of 98 percent by weight of PTFE Resin; 1 percent by weight of bismuth oxide and 1 percent by weight of barium titanate and tubing of this PTFE Resin blend was made in the same manner as above described in example I.

The resulting tubing from a mixture with a concentration of 1 percent by weight of bismuth oxide and 1 percent by weight of barium titanate was X-ray opaque when subjected to test and the tubing was substantially optically opaque.

EXAMPLE VII

A blend of PTFE Resin, bismuth oxide and barium sulfate were intimately mixed in the proportions of 92 percent by weight of PTFE Resin; 4 percent by weight of bismuth oxide and 4 percent by weight of barium sulfate and tubing of this PTFE Resin blend was made in the same manner as above described in example I.

The resulting tubing from a mixture with a concentration of 4 percent by weight of bismuth oxide and 4 percent by weight of barium sulfate was X-ray opaque when subjected to test but was also substantially optically translucent sufficient to view liquids passing into, out of through the tubing.

It was found in each of the samples because of the plastic selected, namely, the perfluorocarbon resin, the inner and outer wall surfaces were smooth and even and substantially friction free so that they were suitably adapted for the use as to which such tubing would be put.

While examples are illustrated only with PTFE homopolymers, it is believed that those skilled in this art will understand that copolymers of PTFE as well as other similar fluorinated polymers could also be used without departing from the spirit of this invention.

It is thought clear from the above that the catheter produced in accordance with the present invention are also sufficiently strong and durable for all conventional and well-known uses.

However, in addition to this, each of these tubes above-illustrated and tubes made in accordance with the present invention will have the advantage of substantially friction free surfaces, X-ray opacity and sufficient optical permeability to provide tubing which is an advance over the existing prior art devices and which meet the problems which such prior art devices have been unable to solve up to the present time.

What is claimed is:

1. Catheter and the like tubing devices for X-ray illumination in living tissue comprising:
   a. a substantially elongated flexible annular wall means forming a tubing member,
   b. the entire annular wall means of said tubing member made of a uniform composition consisting of an unannealed fluorocarbon resin having an index of refraction in a range from 1.3 to 1.9 and at least one X-ray opaque material homogeneously dispersed therein having an index of refraction substantially in the same functional order as the index of refraction of said fluorocarbon resin,
   c. said X-ray opaque material in a ratio to the fluorocarbon resin such that all circumferential portions of the annular wall means of the tubing member will be X-ray opaque and will still retain its optical transparency.
   d. and said annular wall means having a thickness preferably not greater than 0.010 inches.

2. In a catheter and the like tubing devices as claimed in claim 1 wherein the X-ray opaque material is barium sulfate in a ratio to the fluorocarbon resin from 2 to 10 percent by weight of the total composition of the tubing member.

3. In a catheter and the like tubing devices as claimed in claim 1 wherein the X-ray opaque material is bismuth oxide in a ratio to the fluorocarbon resin from 2 to 10 percent by weight of the total composition of the tubing member.

4. In a catheter and the like tubing devices as claimed in claim 1 wherein the X-ray opaque material consists of:
   a. a first X-ray opaque material of barium sulfate;
   b. a second X-ray opaque material of bismuth oxide;
   c. and said barium sulfate and bismuth oxide disposed in a ratio to each other and to the fluorocarbon resin to provide a range of X-ray opaque material of 2 to 10 percent of weight of the total composition of the tubing member.